Oct. 7, 1930.                I. METH                1,777,321
GLASS POLISHING SOLUTION AND METHOD OF POLISHING GLASS
Filed Sept. 24, 1928
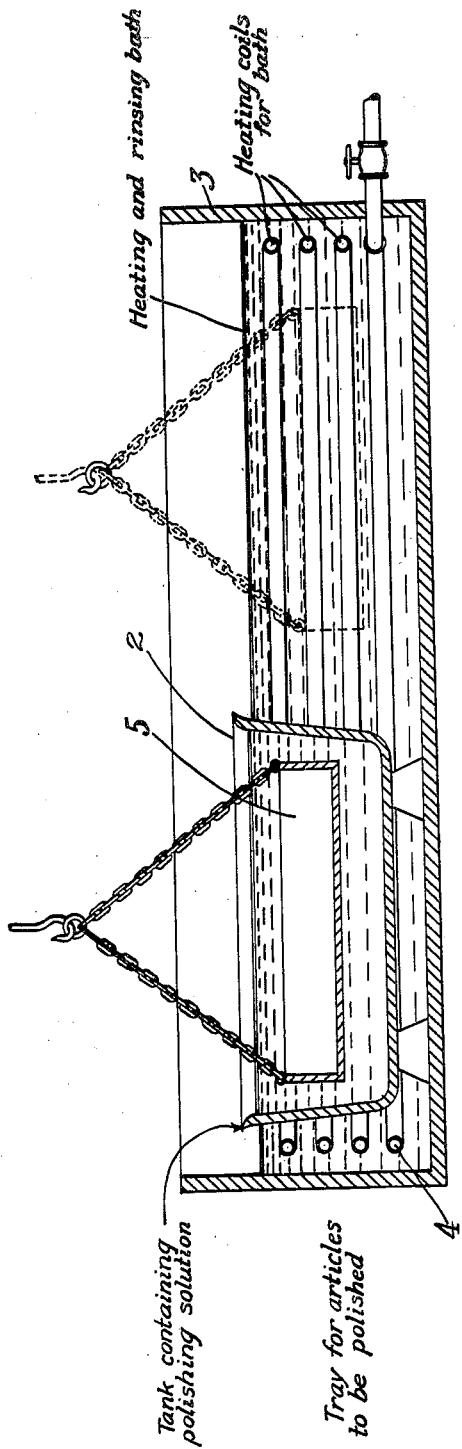
INVENTOR
Isaac Meth
By Green & McCallister
His Attorneys Patented Oct. 7, 1930

1,777,321

UNITED STATES PATENT OFFICE

ISAAC METH, OF PITTSBURGH, PENNSYLVANIA

GLASS-POLISHING SOLUTION AND METHOD OF POLISHING GLASS

Application filed September 24, 1928. Serial No. 308,048.

This invention relates to the art of polishing glass and primarily to novel means and procedure for readily and cheaply accomplishing results, which have heretofore been accomplished only at great expense and with the aid of more or less highly skilled labor.

An object of my invention is to produce a simple relatively cheap and effective method of polishing glass, either for the purpose of removing surface blemishes or as the final step in the operation of cutting glass.

Another object of my invention is to produce a glass polishing solution which is effective and reliable, which may be effectively employed by those not highly skilled in the glass polishing art, and which is of such character as to eliminate the expensive procedure attendant on all glass polishing operations now in commercial use and known to me.

These, and other objects which will be made apparent throughout the further description of my invention are attained by means of the method of procedure herein set forth which, in so far as possible, is illustrated in the accompanying drawings. The drawings diagrammatically illustrate apparatus suitable for use in carrying forward the polishing procedure herein set forth.

It is a well known fact that hydrofluoric acid attacks glass; and this knowledge has long been used in the etching of glass and also in attempts to remove surface blemishes from glass articles. It has, however, been found that hydrofluoric acid cannot be employed in the treatment of glass except where great care and skill is employed, since it has a tendency to pit the glass, and to thereby produce blemishes, which are even more objectional than those which are to be removed by the so-called polishing operation.

As a result of this, it is usual practice to preliminarily prepare the glass article for treatment with hydrofluoric acid or solutions containing the same, by coating all surfaces of the glass article, except those to be treated, with an acid proof material such as paraffin. Even such precautionary measures are not always effective, and they also greatly increase the cost of the polishing and blemish removing operations.

Furthermore, in so far as I know, no solution capable of producing satisfactory results has as yet been produced which will operate as effectively on one quality of glass as another, with the result that the solution must be radically modified or changed for each different kind or quality of glass to be treated. This not only adds expense but necessitates the service of a skilled operator, and often results in the loss of glass articles which have had considerable time, labor and money expended on their production prior to the polishing operation.

In carrying out my invention, I first provide a polishing solution which contains from 2 to 4 parts of hydrofluoric acid (C. P.); 7 to 9 parts sulphuric acid (C. P.); and from 2 to 3 parts of water. In addition, I preferably employ fuming sulphuric acid in such amounts as to make up from 3 to 5% of the entire mixture.

In preparing the solution, I preferably proceed as follows:—I mix 2 parts of water (by volume) with 9 parts of sulphuric acid, and allow the mixture to cool to about atmospheric temperature (75° to 80° F.) I then add 3 parts (by volume) of hydrofluoric acid and again allow the mixture to cool to about atmospheric temperature. These ingredients can be mixed in a lead lined or other acid proof receptacle, and the fuming sulphuric acid is then added in sufficient amounts to constitute about 5% of the mixture.

For best results this mixture is maintained between 100 and 110 degrees F. during the operation of treating the glass articles. I also employ a controlling reagent such for example as phosphoric anhydride, but in such quantities as to approximate 1 gram of the anhydride to 1000 grams of polishing solution.

I mix the solution and treat one or two glass articles for the purpose of observing the action of the solution on the particular glass, which as is well known, may be made from one of several basic elements. I then add a small amount of the phosphoric anhydride for the purpose of controlling the action of the solution on the glass, if the observation discloses that the reaction between the glass and the solution is too rapid or is not uniform throughout the surface of the glass. It is my experience and belief that lack of uniformity of the action of the solution on all portions of the surface of the glass is occasioned by the fact that the action of the solution is more vigorous than is necessary and that the controlling agent modifies the chemical characteristics just sufficiently to produce the desired results.

In obtaining such results, I proceed as follows:—

The solution is prepared as above outlined and is either mixed in, or placed in a lead lined or a copper tank of sufficient size to receive a tray containing as many articles as can be conveniently treated at the same time. For example, the tray may be of such proportions as to receive several dozen glass tumblers. The treating tank is preferably submerged in a water bath which is maintained at the desired temperature by any suitable heating means such, for example, as steam coils. Where a new or different quality of glass is to be polished, one or two articles are submerged in the solution for about 30 seconds. Upon withdrawing the articles, the excess solution is allowed to drip back into the tank and the articles are at once rinsed in warm water. On withdrawing an article from the solution, it will be found that it is covered with a white or greyish white deposit which may be easily removed by the hot water rinsing, but which, so far as I know, is practically insoluble in hot water. The uniformity of the distribution of this coating over the surface of the articles treated, will give some information as to the uniformity of the action of the solution on the glass but a careful examination of the rinsed articles will disclose whether or not the article is pitted and whether or not it is necessary to employ the controlling or modifying reagent to which I have referred. If the test articles disclose a lack of uniformity in the action of the solution throughout the surface of the article, a small amount of the controlling agent is added to the solution and preferably a second test piece is treated as before described.

I have found by experience that the solution will work effectively and produce results which are far superior to any results heretofore obtained and that even where glass articles of different chemical characteristics are to be treated, the solution may be modified to suit the articles in question by merely adding varying amounts of the phosphoric anhydride, but in amounts not to exceed approximately one gram to 1000 grams of solution.

I have also found that where a water bath is used for maintaining the temperature of the solution at the desired operating temperature that the water of this bath may be conveniently and effectively employed for rinsing the glass articles as they are removed from the solution. After the articles are thoroughly rinsed, they may be dried or allowed to dry and further procedure is unnecessary. If, however, the articles are not thoroughly polished after having been submerged in the solution, they may be rinsed and again submerged for approximately 15 or 20 seconds without fear of injuring their surfaces.

When the proper length of time for treating has been determined by test, I prefer to divide the time of treatment into periods and to rinse the glass articles between treatment periods. In other words, if it is determined that 30 seconds is the proper time for treatment, it may be preferable to divide this 30 seconds into from 3 to 6 periods of from 5 to 10 seconds each. The length and number of periods will depend upon the hardness of the glass or its resistance to the action of the treating solution. The glass articles are preferably rinsed between the treating periods to remove the deposit formed during treating.

It will, of course, be apparent that the operation of treating glass ware will weaken the effect of the solution and diminish the quantity of the solution, but I have found that one batch of the solution may be effectively employed in treating a large number of articles and that the batch will retain its activity and its effectiveness for weeks, depending, of course, upon the amount of glass ware treated. As hereinbefore pointed out, some variations may be made in the relative proportions of the different component parts of the solution without materially changing its activity. It will, however, be apparent that if the solution is varied within the limits above stated, the activity of the solution will of necessity be increased or decreased according to the relative amount of hydrofluoric acid contained in the final solution. It will, therefore, be obvious that the time of submergence of the articles to be treated will vary somewhat depending upon the proportions employed in making up the solution and the character of the glass to be treated. I, however, prefer to so proportion the different ingredients of the solution as to obtain the desired result by submerging the articles for approximately a half minute, since I find that the most uniform results are accomplished by delaying the effect of the acid to this extent. It will, therefore, be apparent that some variation in the quantity of the different components of the solution may be made according to the kind or quality of glass being treated, but my experience has been that a solution containing three parts by volume of hydrofluoric acid (60% strength); 9 parts sulphuric acid (26B); 2 parts water; and 5% fuming sulphuric may be employed for all grades and qualities of glass ware by merely modifying the solution by the addition of the so-called modifying or controlling reagent. It is, however, important to maintain the solution between 100 and 110° F. during the operation of treating the glass articles in order to obtain the best and most uniform results.

In the drawings, I have shown a tank 2 made of lead or other acid resisting material which is partially submerged in a water bath contained in a receptacle 3. The receptacle 3 is preferably heated by means of steam coils 4 in such a way as to maintain the desired temperature. I also prefer to make the tank 3 of such dimensions that it may be employed as the rinsing as well as the heating tank. As shown, I preferably employ a tray 5 for receiving the articles to be treated. This tray is either perforated or of skeleton formation so as to permit a relative rapid submergence and a quick flow of the treating solution into and around all the articles contained on the tray. The tray will, of course, be made of acid resisting material and may be employed also as the rinsing tray.

In the drawings, I have shown the tray 5 in full lines in the position it occupies within the treating tank and I have shown it in dotted lines in the position it may occupy in the rinsing tank. A gentle oscillatory motion may be imparted to the tray while it is in the rinsing tank and means should preferably be provided for suspending the tray for a short interval of time over the treating tank in order to avoid unnecessary loss of the treating solution. The duration of the draining period however, should be quite short, since otherwise, the articles being treated may be spoiled by a lack of uniform distribution of the solution over their surfaces.

One of the principal advantages of my solution and the procedure herein set forth is that it is unnecessary to coat or otherwise protect portions of the surface of the various articles treated. In other words, there is no necessity for coating the interiors or edges of glass tumblers or other receptacles with paraffin so long as the trays are so arranged as to permit a quick and thorough draining of the polishing solution from the interior of each article. I have also found that the solution acts with uniformity throughout the entire surface of the article where the treatment is carried forward at the temperature and under the conditions herein set forth. I have also found that the solution is maintained effective for longer periods if the fuming sulphuric is employed, although some variations may be made in the amount of fuming sulphuric which is added to the solution.

While I have described what I now consider to be the preferred embodiment of my invention, it will be apparent to those skilled in the art that various modifications and changes may be made in the proportions or the ingredients employed in making up the polishing solution, without materially affecting the result and without departing from the spirit of my invention.

What I claim is:—

1. A polishing solution for glass containing hydrofluoric acid, sulphuric acid and phosphoric anhydride.

2. A method of polishing glass, which consists in submerging the glass in a mixture maintained at about 100° F. and containing 7 to 9 parts of sulphuric acid, 2 to 3 parts of water, 2 to 4 parts of hydroflouric acid and fuming sulphuric acid sufficient to constitute about 3 to 5% of the mixture, removing the glass from said mixture and washing the same.

3. A method of polishing glass, which consists in submerging the glass in a mixture maintained at about 100° F. and containing 7 to 9 parts of sulphuric acid, 2 to 3 parts of water, 2 to 4 parts of hydrofluoric acid, about 5% of fuming sulphuric acid and a modifying reagent, removing the glass from said mixture and washing the same in warm water.

In testimony whereof, I have hereunto subscribed my name this 19th day of September, 1928.

ISAAC METH.